United States Patent Office 3,075,250
Patented Jan. 29, 1963

3,075,250
METHOD FOR USING PLASTIC END TURN CUPS FOR POTTING WINDINGS OF ELECTRIC MOTORS
Robert D. Strohm, Maple Heights, and Frank J. Kraft and Walter M. Kartman, Cleveland, Ohio, assignors, by mesne assignments, to Lear Siegler, Inc., a corporation of Delaware
Filed May 19, 1958, Ser. No. 736,045
4 Claims. (Cl. 18—59)

This invention relates to dynamoelectric machines and particularly to such machines in which the windings are protected from water, corrosive liquids or atmospheres, as well as from physical damage by embedding the windings in an epoxy resin or other plastic material.

Such windings are normally carried by an annular laminated core structure having a number of axially extending slots circumferentially spaced about the periphery of the core structure. The conductors making up the windings are of considerable continuous length and pass back and forth through the slots of the core structure according to a predetermined winding pattern. In order to proceed from one slot to another, the conductors are formed with end turns that extend axially beyond the faces at each end of the core structure to accomplish 180° changes in direction of the conductors.

It is common to embed the windings, including that portion of them lying in the core structure slots and the end turns, in an epoxy resin or other plastic material in order to protect the windings and end turns from water, oil, corrosive liquids or atmospheres, and to protect them from physical damage. The usual method of embedding or "potting" such windings is to first enclose the core structure with the windings in place within steel molds or dies, the annular core structure and the die parts together forming die cavities about the windings. When the dies are in place, an epoxy or other plastic embedding material can be flowed or injected into the die, the embedding material cured and solidified, and then the die parts removed.

This method of embedding or "potting" the windings of dynamoelectric machines has several disadvantages. First of all, in order to insure that the end turns or 180° loops in the conductors comprising the windings do not contact the inner surface of the die part surrounding them and thus become exposed at the surface of the molded embedding material, it is necessary to tie or otherwise secure the end turns to position them within a reasonably small space, and it is also necessary to increase the thickness of the embedding material in the region of the end turns. The tieing of the end turns is an expensive step and the increased thickness of the embedding material about the end turns is wasteful of both embedding material and space. In addition to these problems, a relatively large number of expensive steel dies must be available when quantity production of machines having embedded windings is undertaken, since the dies must remain in place while the plastic embedding material is cured and solidified.

The primary object of our invention, therefore, is to provide a method and means for embedding the windings of dynamoelectric machines without the use of expensive steel die parts. It is also an object of our invention to provide a method and means whereby it is unnecessary to tie the end turns of the windings to insure their complete coverage by the embedding material. A further object of our invention is to provide means whereby the overall size of the embedding material surrounding the end turns can be reduced without danger of the conductors lying exposed on the surface of the embedding material. Another object of our invention is to provide an improved method and means whereby stator windings, including the end turns, of a dynamoelectric machine may be easily, relatively inexpensively and completely embedded in an epoxy or other plastic material.

Other objects and advantages of our invention will become apparent from the following description of preferred forms thereof, reference being had to the accompanying drawings. The invention is specifically disclosed herein as applied to stator windings. It is to be understood, however, that it may also be utilized in embedding or potting rotor windings as well.

Briefly, the objects of the invention are preferably accomplished by employing annular end cups of plastic material or the like which cover and confine the exposed end turns of the windings. The longitudinal slots in the periphery of the annular core structure are closed and sealed by a resilient sleeve or the like. The entire unit may be placed in a vacuum chamber to evacuate the cavity to be filled and thus prevent the undesirable entrapment of air in the embedding material. The epoxy or other plastic material is then injected or poured through an opening in one of the plastic end cups. The material surrounds the end turns adjacent the point of injection, passes through the slots and surrounds the windings therein, and then fills the end cup remote from the point of injection, surrounding the end turns confined therein. After curing of the embedded material, the expanding arbor and resilient sleeve are loosened and removed. The plastic end cups, with the filling line removed, remain in place as an integral part of the embedding material enveloping the windings.

Figure 1:
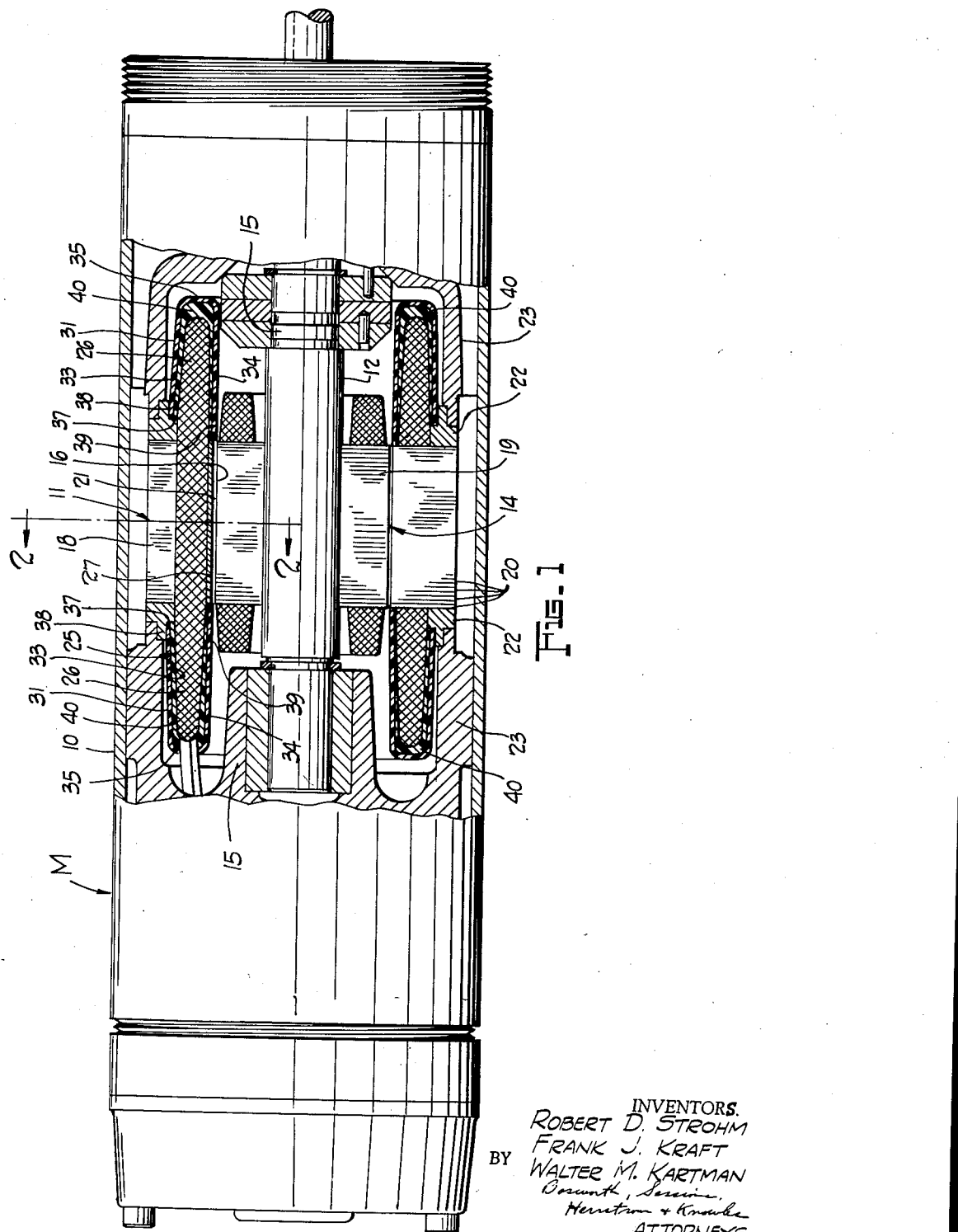
FIGURE 1 is a side elevation view of an electric motor embodying a preferred form of the embedded stator of our invention in which a portion of the casing has been broken away and the exposed stator and rotor have been sectioned on a plane containing the axis of the rotor shaft.

Referring now to the drawings, a preferred embodiment of stator windings embedded in an epoxy or other plastic material in accordance with the teachings of our invention is shown in FIGURE 1 assembled in an otherwise conventional electric motor M having a casing or frame 10 which is broken away in the drawing to show the stator 11. The motor also comprises a motor shaft 12 carrying a rotor 14. The casing 10, stator 11, shaft 12 and rotor 14 are all concentric, the rotor shaft being carried by suitable bearings 15. The stator 11 and rotor 14 have laminated cores 18 and 19, respectively, which are of conventional construction. The core 18 of stator 11 is made up of a number of annular laminations 20, each having notches identically spaced apart about the inner periphery. The laminations 20 are stacked together in axial alignment and with the notches in their inner peripheries aligned to form axially extending parallel slots 21 spaced apart around the bore 16 formed by the stacked laminations. Stator laminations 20 may be held in stacked relationship and proper alignment by welding. End rings 22 are located concentrically with and adjacent to the end of the stator core 18 as shown in FIGURE 1 and provide mounting surfaces for end bells 23 which fit tightly within casing 10.

Figure 2:
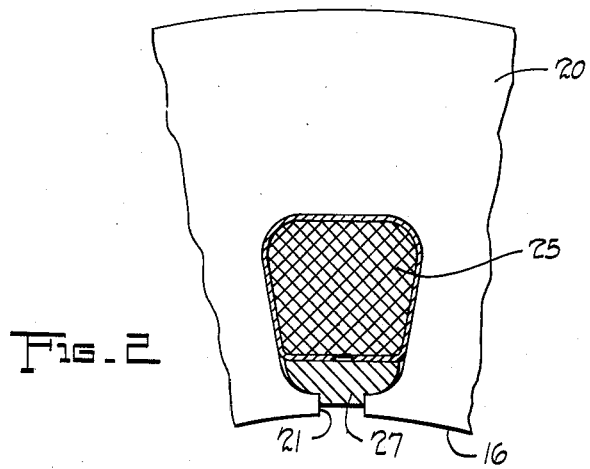
FIGURE 2 is a partial transverse cross section of the stator shown in FIGURE 1, and taken along line 2—2 of FIGURE 1.

The stator windings 25, composed of many turns of fine, insulated wire, are indicated by the crosshatched areas in FIGURE 1. The conductors of stator windings 25 run back and forth in the slots 21 of the stator core structure 18. FIGURE 2 shows a slot 21 in transverse cross section. Each run extends axially beyond the end of the stator core structure 18 whereupon it loops or turns 180° and returns through the proper slot 21 and in this manner continues looping back and forth through the stator slots 21 the desired number of times and according to a definite predetermined pattern for the particular motor involved. The loops of the stator windings 25, extending beyond the ends of stator core structure 18, comprise what are known as the end turns 26.

In order that that those portions of stator windings 25, contained in slots 21, may be securely held therein and so that the plastic embedding material surrounding these portions of the stator windings 25 may not expand into the air gap between rotor core structure 19 and bore 16 of the stator, we prefer to place suitable wedges 27 in the slots 21 so as to confine the stator windings 25 therein between the wedges 27 and the bottoms of the stator slots 21 as shown in FIGURE 2. The wedges 27, preferably formed of a high shear strength non-magnetic material such as an epoxy resin reinforced by glass cloth, extend axially from the slots a short distance beyond each end lamination 20 of core structure 18 for purposes to be described below.

Figure 3:
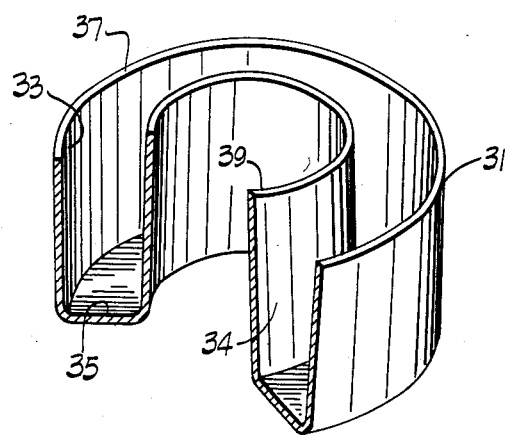
FIGURE 3 is a perspective view of a preferred form of annular end cup, part of the cup being broken away.

Disposed over and about end turns 26 of stator windings 25 are annular end cups 31. End cups 31, shown formed of a suitable plastic material, are each annular in form and comprised of an outer, generally cylindrical wall 33 and an inner, generally cylindrical wall 34 concentric with and radially spaced apart from each other and joined together at one end by end wall 35 so as to form an annular cup having a generally U-shaped cross section as shown in FIGURE 3.

The free end 37 of each of the outer cylindrical walls 33 engages the radially inward surface of an axially extending annular shoulder 38 on the end rings 22. The free end 39 of inner wall 34 engages the radially inward side of that portion of each of the wedges 27 that extend beyond the end laminations 20 of the core structure 18. By so locating the free ends 37 and 39 of the end cup walls 33 and 34, respectively, the end cups sealingly engage the core structure 18 enclosing the end turns 26. Plastic embedding material 40, preferably an epoxy resin, completely fills the space within the end cups 31 and slots 21, surrounding and filling the interstices between the stator windings 25 including end turns 26.

Figure 4:
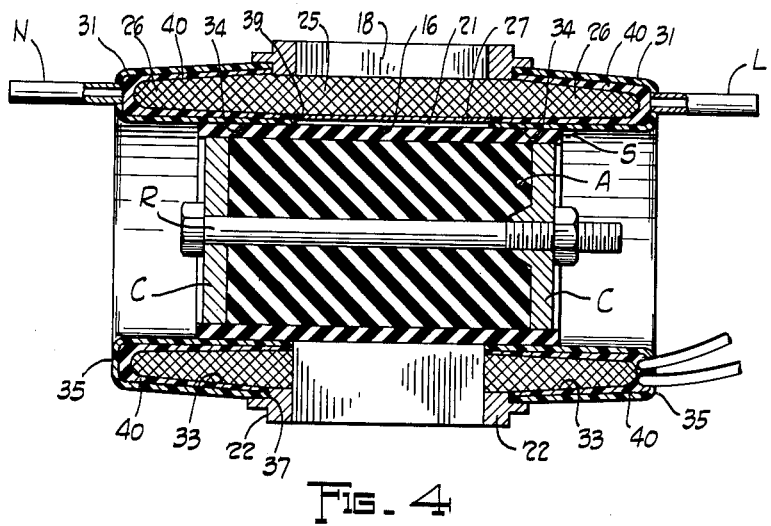
FIGURE 4 is an axial sectional view of the stator of the motor illustrated in FIGURE 1 showing a preferred apparatus for embedding the stator windings.

We prefer to employ the following steps, described in connection with FIGURE 4, in the formation of the preferred embodiment of the stator of our invention. First, the end cups 31 are placed over the end turns 26 and in engagement with the core structure 18 in the manner described above. If desired, the exterior end surfaces 37 may be coated with an epoxy resin solution to seal the cups to the stator shoulders 38. After attaching the end cups 31, a resilient sleeve S and resilient expanding arbor A are placed within the stator bore 16 as shown in FIGURE 4. The expanding arbor A is then expanded within the resilient sleeve S by drawing the cones C together by means of a tie rod R. The resilient sleeve S is thus pressed into sealing engagement with stator bore 16, stator slots 21, and against wedges 27. The expanded arbor A also exerts sufficient pressure against the inner wall 34 of each of the end cups 31 to bring them into sealing engagement with the ends of the wedges 27 extending beyond the core structure 18.

A fill line N and an overflow line L are inserted into suitable holes provided in the end walls 35, one in each of the end cups 31. Next, the entire unit comprising the core structure 18, with the end cups 31, fill line N and overflow line L, and resilient sleeve S and arbor A expanded and in place, is placed in a vacuum chamber and the air evacuated therefrom in a conventional manner. The epoxy or other suitable plastic embedding material 40 is poured through fill line N until the stator is completely filled with embedding material 40, the excess flowing from the overflow line L. The entire unit is then removed from the vacuum chamber and placed in a curing oven until the embedding material has solidified. Lastly, the expanded arbor A, resilient sleeve S and lines N and L are removed.

Figure 6:
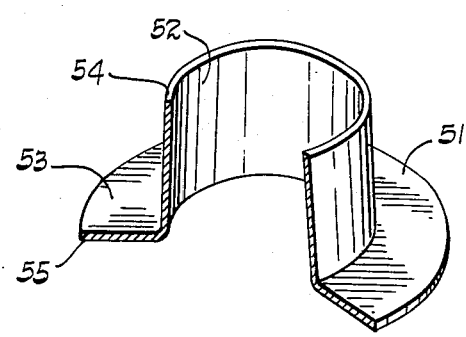
FIGURE 6 is a perspective view of a modified form of annular end cup with part of the cup being broken away.
Figure 5:
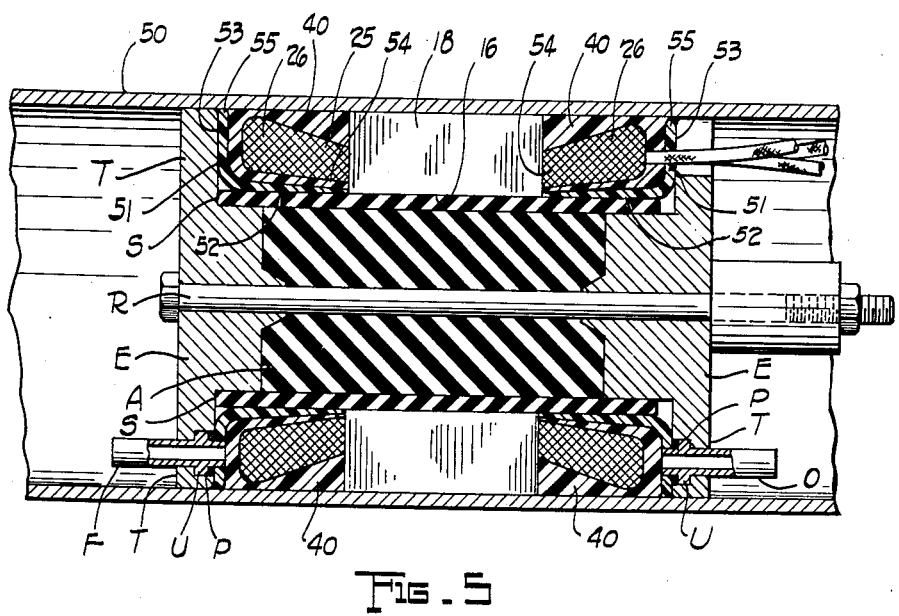
FIGURE 5 is an axial sectional view of a stator of an electric motor mounted directly within the motor frame, showing a modified form of apparatus for embedding the stator windings.

When the embedded stator of our invention is employed in a dynamoelectric machine in which the casing or frame of the machine itself directly supports the core structure of the stator, we prefer to use a modified form of the end cups of our invention. This modified form is seen in FIGURE 5. In this case, the stator core structure 18 is fitted concentrically within a cylindrical casing or frame 50, the outer peripheral surface of the core 18 engaging the inner wall of the casing 50. Plastic end cups 51, each having an axially extending cylindrical wall 52 and a radially extending annular end wall 53 as shown in FIGURE 6, are placed over the end turns 26 so that the free end 54 of cylindrical wall 52 engages the end lamination 20 of the core structure 18 and the free end 55 of annular end wall 53 tightly fits within the inner surface of frame or casing 50. Here also, the ends 55 may be coated with epoxy if desired in order to make a better seal between the cups and the casing 50.

Thus, the end turns 26 of the stator windings 25 are completely enclosed within the two walls of the end cups 51, the frame or casing 50 and the core structure 18. Plastic embedding material 40 fills the space within the end cups 51 and the slots 21, completely surrounding and filling the interstices between the windings 25 including end turns 26.

The modified form of our invention is formed in much the same manner as the preferred embodiment. The plastic end cups 51 are first placed over the end turns 26 and within the frame or casing 50. The expanding arbor A and resilient sleeve S are then placed within the internal bore of the core structure 18. The end cones E, in this case, are formed with radially extending shoulders T which engage the end walls 53 of the plastic end cups 51, holding them in place against the pressure exerted from within the end cups 51 by the embedding material. The arbor A is then expanded by drawing the end cones E together by means of tie rod R, pressing resilient sleeve S into sealing engagement with bore 16.

A fill nipple F, having an annular shoulder U, extends through and is held in place adjacent a suitable hole in one of the plastic end cups 51 by a counterbored passage P in one of the end cones E. An O-ring may be employed to seal the nipple F within the end cones E. An overflow nipple O provides an opening into the other end cup 51 and is held in place by the other end cone E in the same manner as the fill nipple F.

After assembling the units just described, an epoxy resin or other suitable plastic embedding material 40 is forced through the fill nipple F under pressure. In order to insure the complete filling of the spaces about the stator windings 25, the embedding material should be forced through the fill nipple until excess material flows out of the overflow nipple O. Following the injection of the embedding material, the entire unit is placed in a curing oven until the embedding material has solidified. Upon removal from the oven, the expanding arbor A, resilient sleeve S and fill nipples F and O are removed.

The stator windings may be surrounded by embedding material either by use of an evacuated chamber and gravity flow as described above in connection with the previously described embodiment, by injection under pressure without the use of an evacuated chamber as described in connection with the modified form above, or by the use of both vacuum and pressure. It is also understood that wedges for holding the stator windings within the stator slots need not be used in connection with the preferred embodiment described herein.

Those skilled in the art will appreciate that various other changes and modifications can be made in the preferred form of method and apparatus described herein without departing from the spirit and scope of the invention.

We claim:

1. A method of embedding the windings of a dynamoelectric machine having a cylindrical structure including an annular core having annular end faces, said windings being longitudinally disposed in axially aligned slots in the exposed cylindrical periphery of the annular core, said slots extending from end face to end face, and said windings having end turns extending axially from said slots beyond each of said annular end faces of said core, comprising the steps of (1) disposing a unitary annular end cup of insulating material adjacent each of said annular end faces and over and about and in enclosing relationship with said end turns extending axially therebeyond, each of said end cups having radially spaced annular free wall ends in positioning and enclosing engagement with the cylindrical structure of said machine at points both radially inwardly and radially outwardly of said end turns with which it is related and at least one of such end cups having a limited opening fill passage therein so that said end cups and the cylindrical structure of said machine cooperate to provide a space about their related end turns in communication with said slots opening into said end faces and said fill opening passage and otherwise totally enclosed, (2) sealing the slots in the periphery of the core, (3) filling through said fill opening said slots and said end cups and surrounding said windings including said end turns and the interstices therebetween with embedding material, and (4) heating said embedding material to cure, solidify and integrally bond it to said end cups.

2. A method of embedding the windings of a dynamoelectric machine having a cylindrical structure including an annular core having annular end faces, said windings being longitudinally disposed in axially aligned slots in the exposed cylindrical periphery of the annular core, said slots extending from end face to end face, and said windings having end turns extending axially from said slots beyond each of said annular end faces of said core, comprising the steps of (1) disposing a unitary annular end cup of insulating material adjacent each of said annular end faces and over and about and in enclosing relationship with said end turns extending axially therebeyond, each of said end cups having radially spaced annular free wall ends in positioning and enclosing engagement with the cylindrical structure of said machine at points both radially inwardly and radially outwardly of said end turns with which it is related and at least one of such end cups having a limited opening fill passage therein so that said end cups and the cylindrical structure of said machine cooperate to provide a space about their related end turns in communication with said slots opening into said end faces and said fill opening passage and otherwise totally enclosed, (2) sealingly cementing at least one of said free wall ends of each of said end cups to the cylindrical structure of said machine, (3) sealing the slots in the periphery of the core, (4) filling through said fill opening said slots and said end cups and surrounding said windings including said end turns and the interstices therebetween with embedding material, and (5) heating said embedding material to cure, solidify and integrally bond it to said end cups.

3. A method of embedding the stator windings in a dynamoelectric machine having a cylindrical stator structure including an annular stator core having annular end faces and axially aligned slots in its exposed and unlined internal bore extending from end face to end face and having a cylindrical casing means extending axially beyond said end faces from about their radially outward periphery, said windings disposed in said slots and having end turns extending axially from said slots beyond said annular end faces, comprising the steps of (1) disposing a unitary annular end cup of insulating material adjacent each of said annular faces and over and about and in enclosing relationship with said end turns extending axially therebeyond, each of said end cups having radially spaced annular free wall ends with the radially outwardly one of said free wall ends in positioning and enclosing engagement with said cylindrical casing means and the other one of said free wall ends in positioning and enclosing engagement with said stator core and at least one of such end cups having a limited opening fill passage therein so that said end cups and the cylindrical stator structure of said machine cooperate to provide a space about their related end turns in communication with said slots opening into said end faces and said fill opening passage and otherwise totally enclosed, (2) sealingly cementing said radially outward free wall ends of said cups to said cylindrical casing means along their areas of engagement therewith, (3) expanding a resilient sleeve within the bore of said core into sealing engagement with said bore for sealing said slots from communication with said bore, (4) filling through said fill opening said slots and said end cups and surrounding said windings including said end turns and the interstices therebetween with embedding material, (5) heating said embedding material to cure, solidify and integrally bond it to said end cups, and thereafter (6) removing only said resilient sleeve from within the bore of said core.

4. A method of embedding the stator windings in a dynamoelectric machine having a cylindrical stator structure including an annular stator core having annular end faces and axially aligned slots in its exposed and unlined internal bore extending from end face to end face and having an annular end ring disposed about the radially outward marginal portion of each of said end faces, said windings disposed in said slots and having end turns extending axially from said slots beyond said annular end faces, comprising the steps of (1) disposing a unitary annular end cup of insulating material adjacent each of said annular end faces and over and about and in enclosing relationship with said end turns extending axially therebeyond, each of said end cups having radially spaced annular free wall ends with the radially outwardly one of said free wall ends in positioning and enclosing engagement with one of said annular end rings and the other one of said free wall ends in positioning and enclosing engagement with said stator core radially inwardly of said end turns and at least one of such end cups having a limited opening fill passage therein so that said end cups and the cylindrical stator structure of said machine cooperate to provide a space about their related end turns in communication with said slots opening into said end faces and said fill opening passage and otherwise totally enclosed, (2) sealingly cementing said radially outward free wall ends of said cups to said annular end rings along their areas of engagement therewith,
(3) expanding a resilient sleeve within the bore of said core into sealing engagement with said bore for sealing said slots from communication with said bore,
(4) filling through said fill opening said slots and said end cups and surrounding said windings including said end turns and the interstices therebetween with embedding material,
(5) heating said embedding material to cure, solidify and integrally bond it to said end cups, and thereafter
(6) removing only said resilient sleeve from within the bore of said core.

References Cited in the file of this patent

UNITED STATES PATENTS

| | | |
|---|---|---|
| 1,538,187 | Herrick | May 19, 1925 |
| 2,354,551 | Sawyer | July 25, 1944 |
| 2,636,137 | Andrus | Apr. 21, 1953 |
| 2,683,233 | Ruhl | July 6, 1954 |
| 2,749,456 | Luenberger | June 5, 1956 |
| 2,772,046 | Shomphe | Nov. 27, 1956 |
| 2,804,559 | Brewer | Aug. 27, 1957 |
| 2,810,847 | Tweedy | Oct. 22, 1957 |
| 2,829,288 | Schaefer | Apr. 1, 1958 |
| 2,944,297 | Maynard | July 12, 1960 |
| 2,967,346 | McMaster et al. | Jan. 10, 1961 |

FOREIGN PATENTS

| | | |
|---|---|---|
| 166,397 | Australia | Dec. 23, 1955 |
| 723,910 | France | Jan. 23, 1932 |
| 760,717 | Great Britain | Nov. 7, 1956 |